L. W. ROTH.
CAMERA SHUTTER OPERATING DEVICE.
APPLICATION FILED MAR. 9, 1914.
1,186,837.
Patented June 13, 1916.
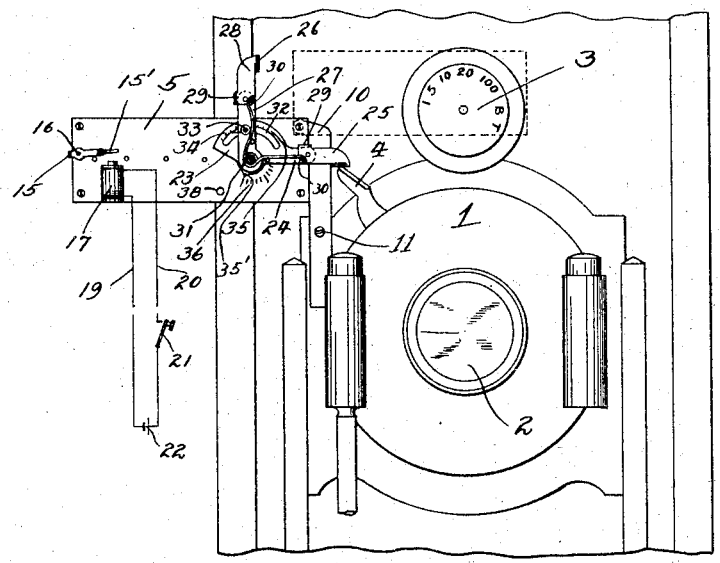
*Fig. 1.*
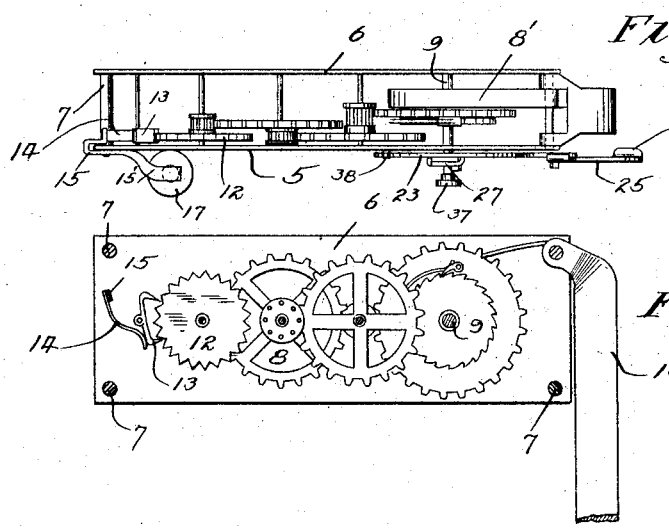
*Fig. 2.*
*Fig. 3.*
WITNESSES:
H. A. Stock
M. A. Stock
INVENTOR
Louis W. Roth
BY
H. C. Schroeder.
ATTORNEY
THE COLUMBIA PLANOGRAPH CO., WASHINGTON, D. C.

UNITED STATES PATENT OFFICE.

LOUIS W. ROTH, OF OAKLAND, CALIFORNIA.

CAMERA-SHUTTER-OPERATING DEVICE.

1,186,837.  Specification of Letters Patent.  Patented June 13, 1916.

Application filed March 9, 1914.  Serial No. 823,400.

*To all whom it may concern:*

Be it known that I, Louis W. Roth, a citizen of the United States, residing at Oakland, in the county of Alameda and State of California, have invented certain new and useful Improvements in Camera-Shutter-Operating Devices, of which the following is a specification.

This invention relates to a device for automatically operating a camera shutter at a predetermined interval after starting the mechanism, thereby enabling the operator to get in focus and take his own picture.

The principal object of this invention is to provide a simple device of the character named, which will not only operate the shutter for snap-shots but will also take time exposures.

Another object is to provide a small light weight device which may be permanently attached to the head of the folding type camera and which may be folded with the same into the case.

Another object of my invention is to provide means for starting the mechanisms at a distance, which gives the operator greater time in which to reach a distant or difficult position.

Referring to the drawings forming part of this specification, Figure 1 is a view in front elevation of the center portion of a camera showing my device attached thereto and about to operate the shutter. Fig. 2 is an enlarged view in plan of the device. Fig. 3 is a view in elevation of the operating mechanism, the front side plate of the case being removed.

Denoting corresponding parts by the same numerals of reference, 1 indicates the head of a camera, having the lens 2, a time regulating disk 3, and the lever 4, by which the shutter is operated. The apparatus for automatically operating the shutter consists of a small light frame having side plates 5 and 6 connected by bars 7 and pivotally mounted in these plates and between the same is a train of gears 8 driven by a coil spring 8′. This spring is attached to shaft 9 and to one of the bars 7 on which is also pivotally mounted a strip 10. The latter strip is attached to the camera head as by a screw 11 and may be left permanently in place as the pivotally mounted frame is folded as shown in dotted lines, when the head is to be slid into its case.

The train of gears terminate in a toothed wheel 12 provided with escapement lever 13 to prevent the too rapid movement of the train. This lever is normally held in contact with the wheel 12 by means of a light spring 14 mounted on the lever 15, which is pivoted to the outside of plate 5 as shown at 16 being curved around the edge of the plate to the inside at which point the spring is attached. The other end 15′ of this lever is flattened and projects over the core of a small electromagnetic coil 17 which is connected by conductors 19 and 20 with a key 21 and source of current 22.

Attached to shaft 9 on the outside of plate 5 is a segmental disk 23 having an arm 24 whereon is pivotally mounted an extension 25 having a laterally extending lip 26 adapted to engage the operating lever 4. Pivotally mounted on shaft 9 outside of disk 23 is an arm 27 having a pivoted extension 28, which is provided with a laterally extending lip 26 also adapted to engage the lever 4. These extensions 25 and 28 are both provided with a bent lip 29 adjacent the pivotal point which overlaps this respective supporting arm and prevents rotation in one direction. On the side opposite this lip is formed a lug 30 against which bears the end of spring 31 and holds the lip 29 in contact with the supporting arm. Arm 27 is adjustably held to disk 23 by means of a flat headed screw 33 slidable in slot 32 in the disk passing through a hole in the arm, and is provided with a tightening nut 34. By means of this nut the distance between arms 24 and 27 may be varied and suitable graduations 35 are provided on the disk which indicate the interval between which the arms pass a given point. In like manner graduations 36 are provided on plate 5, which indicate the interval from the time the device is placed in operation until the first arm 24 contacts with lever 4.

The operation of this device is as follows:—shaft 9 is rotated by thumb nut 37 in a lefthand direction thereby winding spring 8. This rotation is continued until pointer 35′ indicates on graduations 36 the desired interval or until arm 24 contacts with the stop pin 38, the latter being of such height as not to contact with arm 27. During this time the parts are prevented from rotating by spring 14 contacting with escapement lever 13. When lever 15 is moved either by pressing end 15′ manually or by the electromagnetic coil 17, spring 14 is withdrawn and the gear train begins to rotate carrying arms 24 and 27 in a clockwise direction. During the winding of the spring it will be obvious that the pivoted extensions 25 and 28 will be doubled back as the arms pass lever 4. After a given interval depending on the amount the spring was wound extension 25 contacts with lever 4 pushing it downward and operating the shutter. If the movable arm 27 is located intermediate the ends of slot 32 this arm also contacts with lever 4 and again operates the shutter thus enabling a time exposure to be taken. If however, arm 27 is moved to the extreme left of the slot arm 24 contacts with stop pin 38 before arm 27 depresses the lever and rotation stop, which is the condition for taking snap shots.

While I have shown the preferred embodiment of my invention it will of course be understood that changes may be made in minor details and arrangement of parts without departing from the spirit thereof.

What I claim is:—

1. The combination with a camera having a movable head and having a shutter with its operating lever carried on said head, of an operating device for said lever pivotally mounted on said head and arranged when in position for use to extend out to one side of the head, but arranged when not in use to fold within the projected outline of the head.

2. The combination with a camera having a movable head and a shutter with its operating lever mounted on said head, of a strip fixed vertically to said head, and a lever operating device pivoted to the upper end of said strip and having a frame arranged to contact with the side of the strip in such manner that the lever operating device is held in operative position when the same has been swung in one direction around its pivot, said lever operating device bending into its inoperative position when moved in the other direction around its pivot and also lying entirely within the projected area of the head when in the inoperative position.

In testimony whereof I affix my signature in presence of two witnesses.

LOUIS W. ROTH.

Witnesses:
W. A. STOCK,
R. M. OYARZO.

Copies of this patent may be obtained for five cents each, by addressing the "Commissioner of Patents, Washington, D. C."